United States Patent
Pons

(10) Patent No.: US 12,305,570 B2
(45) Date of Patent: May 20, 2025

(54) RECOVERED-CYCLE TURBOSHAFT ENGINE

(71) Applicant: SAFRAN HELICOPTER ENGINES, Bordes (FR)

(72) Inventor: Bernard Claude Pons, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/726,349

(22) PCT Filed: Jan. 2, 2023

(86) PCT No.: PCT/FR2023/050001
§ 371 (c)(1),
(2) Date: Jul. 2, 2024

(87) PCT Pub. No.: WO2023/135378
PCT Pub. Date: Jul. 20, 2023

(65) Prior Publication Data
US 2025/0067211 A1    Feb. 27, 2025

(30) Foreign Application Priority Data
Jan. 12, 2022    (FR) .................................... 2200229

(51) Int. Cl.
*F02C 3/107*    (2006.01)
*F02C 7/10*    (2006.01)
(Continued)

(52) U.S. Cl.
CPC ................ *F02C 3/107* (2013.01); *F02C 7/10* (2013.01); *F02C 7/32* (2013.01); *F02C 7/36* (2013.01)

(58) Field of Classification Search
CPC .... F02C 3/10; F02C 3/107; F02C 7/10; F02C 7/32; F02C 7/36
See application file for complete search history.

(56) References Cited

U.S. PATENT DOCUMENTS 3,088,278 A * 5/1963 Franz ..................... F02C 3/145
                                                 415/126
3,488,947 A * 1/1970 Tischer .................... F02C 7/36
                                                 188/291

(Continued)

FOREIGN PATENT DOCUMENTS

FR    2962487 A1    1/2012
RU    2563079 C1    9/2015

OTHER PUBLICATIONS

International Search Report and Written Opinion received for PCT Patent Application No. PCT/FR2023/050001, mailed on Apr. 14, 2023, 14 pages (7 pages of English Translation and 7 pages of Original Document).

*Primary Examiner* — Steven M Sutherland
(74) *Attorney, Agent, or Firm* — WOMBLE BOND DICKINSON (US) LLP

(57) ABSTRACT

A turboshaft engine for an air-craft including a gas generator including a compressor, a combustion chamber and an expansion turbine; a power turbine rotating a power take-off by a reduction gear; a heat exchanger including a first circuit and a second circuit. The compressor includes a first shaft rotated by a second shaft of the expansion turbine by a trans-mission mechanism, the transmission mechanism and the reduc-tion gear forming part of a gearbox which is arranged axially at a front end of the turboshaft engine, such that the compressor is arranged axially between the gearbox and the power turbine.

13 Claims, 4 Drawing Sheets

(51) Int. Cl.
    *F02C 7/32*     (2006.01)
    *F02C 7/36*     (2006.01)

(56) References Cited

U.S. PATENT DOCUMENTS

| | | | | |
|---|---|---|---|---|
| 3,514,945 | A | * | 6/1970 | Austin ................ F02C 7/32 |
| | | | | 60/39.182 |
| 6,092,361 | A | * | 7/2000 | Romani .............. F02C 3/10 |
| | | | | 60/39.511 |
| 2009/0277154 | A1 | | 11/2009 | Wood |
| 2013/0086906 | A1 | | 4/2013 | Thomas |

\* cited by examiner

RECOVERED-CYCLE TURBOSHAFT ENGINE

TECHNICAL FIELD OF THE INVENTION

The present invention relates to a recovered-cycle turboshaft engine for an aircraft.

TECHNICAL BACKGROUND

The application FR2962487A1 in the name of the applicant describes the first architecture of a recovered-cycle turboshaft engine.

Such a turboshaft engine of this type comprises, in particular, from front to back, an air inlet, a compressor, a combustion chamber, an expansion turbine (bonded turbine or high-pressure turbine), a power turbine (free turbine or low-pressure turbine), and finally an exhaust nozzle.

The compressor, the combustion chamber and the expansion turbine form a gas generator in which the rotor of the compressor is mechanically driven by the rotor of the expansion turbine via a transmission shaft.

The power turbine is independent of the gas generator, and is designed to drive a power take-off (or PTO) on the turboshaft engine, to which the thruster(s) of the aircraft, for example, are connected.

The air entering through the air inlet is compressed by the compressor and then injected into the combustion chamber to be mixed with fuel. The air/fuel mixture is burnt and expanded in the expansion turbine and then in the power turbine before being discharged from the turboshaft engine through the exhaust nozzle.

The turboshaft engine is said to have a "recovered-cycle" because the residual thermal energy in the exhaust gases is recovered via heat exchangers placed in the exhaust nozzle, then reinjected into the turboshaft engine to optimise its efficiency.

The application US20090277154A1 describes a second recovered-cycle turboshaft engine architecture.

The distinctive characteristic of this second architecture is that its combustion chamber is at one rear end of the turboshaft engine, with the expansion and power turbines located axially between the compressor and the combustion chamber, and the exhaust gases being discharged from the turboshaft engine via two V-shaped nozzles arranged substantially in the middle of the turboshaft engine.

In such an architecture, the air compressed by the compressor is conveyed back into the combustion chamber via supply ducts arranged around the turbines, the compressed air being diverted before it enters the combustion chamber.

The thermal energy recovered by the heat exchangers is used here to heat the compressed air leaving the compressor before it enters the combustion chamber.

This type of architecture allows to improve the performance of the turboshaft engine, since the quantity of fuel to be injected to reach the operating temperatures is less than that required in the case of a conventional cycle turboshaft engine (i.e. a turboshaft engine in which the compressed air leaving the compressor is fed directly into the combustion chamber without first being heated).

The power take-off is driven by the power turbine via a reduction gear located axially between the compressor and the turbines.

Compared with the first architecture described above, this second architecture described in US20090277154A1 has the advantage of intersecting the air flux leaving the compressor, which is fed to the combustion chamber via two supply ducts, with the flux of hot gases leaving the two exhaust nozzles. It is therefore particularly suited to the integration of heat exchangers for the recovered cycle, while minimising the length of ducts required and therefore the weight and footprint of the recovered cycle system.

However, the second architecture has its drawbacks.

Firstly, the aforementioned reduction gear is generally associated with an accessory gearbox, which is designed to transmit mechanical power taken from the turbines to various turboshaft engine accessories such as a pump, starter-alternator, air/oil separator, etc.

The reduction gear and accessory gearbox are bulky, which significantly limits the space available around the compressor and turbines, and therefore the possibilities for installing the heat exchanger(s) designed to recovered residual thermal energy from the exhaust gases.

Secondly, the arrangement of the reduction gear substantially in the middle of the turboshaft engine means that the power take-off has to be offset considerably to bypass the compressor and the supply ducts in particular, to the detriment of the mass and balance (or weight distribution) of the turboshaft engine.

The aim of the present invention is therefore to provide a simple, effective and economical solution to the above-mentioned drawbacks.

The prior art also includes the document RU2563079C1.

SUMMARY OF THE INVENTION

The invention thus provides a turboshaft engine for an aircraft, the turboshaft engine comprising:
- a gas generator comprising a compressor, a combustion chamber and an expansion turbine, the compressor and the expansion turbine extending along a common longitudinal axis X and being mechanically connected to one another, the combustion chamber being arranged axially at a rear end of the turboshaft engine;
- a power turbine arranged axially between the compressor and the expansion turbine, the power turbine driving a power take-off in rotation via a reduction gear;
- a heat exchanger comprising:
- a first circuit comprising an inlet connected to an outlet of the compressor, and an outlet connected to an inlet of the combustion chamber, and
- a second circuit comprising an inlet connected to an outlet of the power turbine,
- characterised in that the compressor comprises a first shaft driven in rotation by a second shaft of the expansion turbine via a transmission mechanism, said transmission mechanism and said reduction gear forming part of a transmission casing which is arranged axially at a front end of the turboshaft engine, so that the compressor is arranged axially between the transmission casing and the power turbine.

A transmission mechanism of this kind allows the rotational movement initiated by the expansion turbine to be transmitted to the compressor, with the possibility of modifying its speed, so as to operate the compressor within the desired operating range. For example, it is possible to increase the speed of the first shaft of the compressor, so as to minimise the number of compression stages required, to the benefit in particular of the axial dimensions of the turboshaft engine.

Such an arrangement of the transmission casing (reduction gear and transmission mechanism) allows space to be freed up around the compressor and turbines for installing the heat exchanger. It is now possible to consider installing an annular heat exchanger around the axis X.

Such an arrangement of the transmission casing also simplifies access to and drive of the power take-off.

This type of turboshaft engine architecture is known as a "recovered cycle" because the residual thermal energy in the exhaust gases is recovered via the heat exchanger to heat the compressed air leaving the compressor before it enters the combustion chamber. This type of recovered-cycle architecture improves the performances of the turboshaft engine, since the quantity of fuel to be injected to reach operating temperatures is less than that required in the case of a conventional-cycle turboshaft engine.

The turboshaft engine according to the invention may comprise one or more of the characteristics, taken in isolation from each other or in combination with each other:

the power turbine comprises a third shaft, the first, second and third shafts being coaxial with said longitudinal axis X;

the third shaft of the power turbine is arranged radially between the first and second shafts;

said transmission mechanism has a transmission ratio greater than 1, so that the speed of the first shaft of the compressor is greater than the speed of the second shaft of the expansion turbine;

said transmission mechanism is a gear mechanism;

said transmission mechanism comprises a first toothed wheel secured to the first shaft of the compressor and a second toothed wheel secured to the second shaft of the expansion turbine, said reduction gear comprising a third toothed wheel secured to a third shaft of the power turbine, the third toothed wheel of the reduction gear being axially arranged between said first and second toothed wheels of the transmission mechanism;

the transmission casing has, from front to back, the second toothed wheel, the third toothed wheel and the first toothed wheel;

said power take-off is coaxial or vertically aligned with said longitudinal axis X;

the first shaft of the compressor is guided in rotation via a first bearing and a second bearing arranged in the transmission casing;

said second shaft of the expansion turbine is guided in rotation via a third bearing arranged in the transmission casing, and a fourth bearing arranged either between the expansion and power turbines or at a rear end of said second shaft located on the opposite side to the power turbine;

said third shaft of the power turbine is guided in rotation via a fifth bearing arranged in the transmission casing, and a sixth bearing arranged axially between the compressor and the power turbine;

the heat exchanger is annular around said longitudinal axis X;

the heat exchanger is arranged at least partly around the power turbine;

the heat exchanger is sectorized and comprises at least two sectors placed circumferentially end to end or circumferentially spaced apart, each sector of the heat exchanger comprising a sub-inlet of the first circuit connected to the outlet of the compressor;

the heat exchanger is a single part;

the turboshaft engine comprises at least a first bypass duct having an inlet connected to the outlet of the compressor and an outlet connected to the inlet of the combustion chamber, so that the first bypass duct supplies the combustion chamber with compressed air leaving the compressor without passing through the heat exchanger;

the turboshaft engine comprises at least one second bypass duct having an inlet connected to the outlet of the power turbine and an outlet connected to the nozzle, so that the second bypass duct supplies the nozzle with exhaust gas leaving the power turbine without passing through the heat exchanger;

the reduction gear forms part of a transmission casing, the transmission casing comprising an accessory gearbox intended to transmit mechanical power taken from the compressor and/or the expansion turbine and/or the power turbine to various accessories of the turboshaft engine;

the exchanger comprises a shield for retaining the movable blades of the power turbine, configured to contain said movable blades in the event of overspeed of the power turbine;

the heat exchanger includes a layer of acoustic attenuation.

The present invention also relates to an aircraft, preferably a single-engine helicopter, comprising a turboshaft engine as described above.

BRIEF DESCRIPTION OF THE FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figure 1:
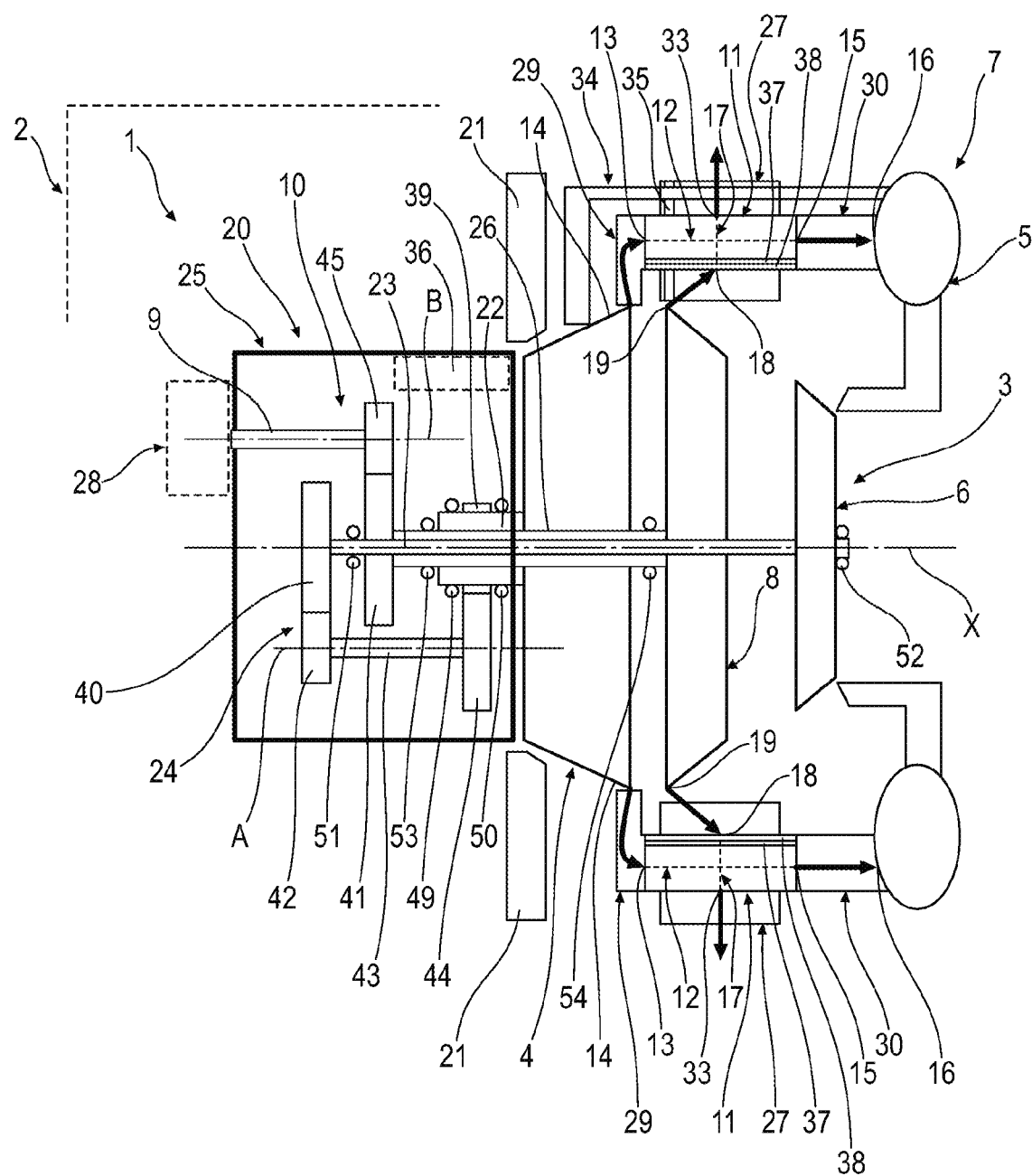
FIG. 1 is a schematic view of a turboshaft engine according to the invention.

FIG. 1 shows a schematic diagram of a turboshaft engine 1 for an aircraft 2. The aircraft 2 is preferably a single-engine helicopter, and in particular a light, single-engine helicopter whose maximum take-off weight (MTOW) does not exceed 3175 kg (or 7000 lbs).

The turboshaft engine 1 comprises:

a gas generator 3 comprising a compressor 4, a combustion chamber 5 and an expansion turbine 6, the compressor 4 and the expansion turbine 6 being mechanically connected to each other, the combustion chamber 5 being arranged axially at a rear end 7 of the turboshaft engine 1;

a power turbine 8 arranged axially between the compressor 4 and the expansion turbine 6, the power turbine 8 driving a power take-off 9 in rotation via a reduction gear 10;

a heat exchanger 11 comprising:

a first circuit 12 comprising an inlet 13 connected to an outlet 14 of the compressor 4, and an outlet 15 connected to an inlet 16 of the combustion chamber 5, and a second circuit 17 comprising an inlet 18 connected to an outlet 19 of the power turbine 8.

According to the invention, the compressor 4 comprises a first shaft 22 driven in rotation by a second shaft 23 of the expansion turbine 6 via a transmission mechanism 24, said transmission mechanism 24 and said reduction gear 10 forming part of a transmission casing 25 which is arranged axially at a front end 20 of the turboshaft engine 1, so that the compressor 4 is arranged axially between the transmission casing 25 and the power turbine 8.

Such a transmission mechanism 24 allows the rotational movement initiated by the expansion turbine 6 to be transmitted to the compressor 4 with the possibility of modifying its speed, so as to operate the compressor 4 within the desired operating range.

This arrangement of the transmission casing 25 allows space to be freed up around the compressor 4 and turbines 6, 8 for the heat exchanger 11, and also simplifies access to and drive of the power take-off 9.

This type of turboshaft engine 1 is called a "recovered cycle" because the residual thermal energy in the exhaust gases is recovered via the heat exchanger 11 to heat the compressed air leaving the compressor 4 before it enters the combustion chamber 5. This type of recovered cycle architecture improves the performance of the turboshaft engine 1, since the quantity of fuel to be injected to reach operating temperatures is less than that required in the case of a conventional cycle turboshaft engine.

The turboshaft engine 1 is defined along a longitudinal axis X which corresponds to the axis of rotation of the shafts 22, 23, 26 respectively of the compressor 4 and turbines 6, 8 of the turboshaft engine 1.

By convention, in this application, the terms "front" and "rear" define the axial positions of the elements of the turboshaft engine 1 in relation to each other, bearing in mind that the transmission casing 25 is arranged axially at a front end 20 of the turboshaft engine 1, and the combustion chamber 5 is arranged axially at a rear end 7 of the turboshaft engine 1.

"Axial" or "axially" means any direction parallel to the axis X of the turboshaft engine 1, and "radial" or "radially" means any direction perpendicular to the axis X of the turboshaft engine 1.

Similarly, by convention in the present application, the terms "internal" and "external" associated with the turboshaft engine 1 are defined radially with respect to the axis X of the turboshaft engine 1.

As shown in FIG. 1, the compressor 4 is supplied with air via an air inlet 21 and comprises a first shaft 22 which is movable about the axis X. The compressor 4 may comprise one or more compression stages, each stage being either axial or centrifugal. The rotors of each stage (wheel or impeller) are secured in rotation to the first shaft 22.

Advantageously, the last stage of the compressor 4 is a centrifugal stage.

The combustion chamber 5 is located axially at a rear end 7 of the turboshaft engine 1. The chamber 5 is supplied with compressed and heated air (via heat exchanger 11), and with fuel via one or more injectors depending on the combustion chamber technology chosen. The air/fuel mixture is burnt by one or more ignition devices. The combustion chamber 5 may have separate pots or direct flux or reverse flux.

A combustion chamber with separate pots has the advantage of having a low production cost, as long as the number of injectors is reduced (it can be limited to a single injector) and of being compact, allowing, for example, the integration of devices designed to minimize pollutant emissions at the rear end of the chamber. This type of combustion chamber also has a small envelope, allowing the cooling air required to be kept to a minimum and simplifying the implementation of "Lean Premix Prevaporised" (LPP) technology.

A direct flux combustion chamber also has the advantage of being compact, allowing the cooling air required to be kept to a minimum. The amount of cooling air required for a direct flux combustion chamber is less than that required for a reverse flux combustion chamber.

A reverse flux combustion chamber (or return combustion chamber) has the advantage of minimising the axial dimensions of the turboshaft engine and freeing up a central space in which one or more elements, such as a guide bearing for the shaft 23 of the expansion turbine 6, can be integrated.

The expansion turbine 6 (also known as the high-pressure turbine) comprises a second shaft 23 which is movable about the axis X. The expansion turbine 6 may comprise one or more expansion stages, each stage being either axial or centripetal. The rotors of each stage (wheel or impeller) are secured in rotation to the second shaft 23. The exhaust gases from the combustion chamber 5 are expanded in the expansion turbine 6 and then in the power turbine 8.

The power turbine 8 (also known as a free turbine or low-pressure turbine) is independent of the gas generator 3 and comprises a third shaft 26 which is movable about the axis X. The power turbine 8 may comprise one or more expansion stages, each stage being either axial or centripetal. The rotors of each stage (wheel or impeller) are secured in rotation to the third shaft 26. The exhaust gases leaving the power turbine 8 first pass through the heat exchanger 11 (and more precisely the second circuit) before being discharged to the outside environment via an exhaust nozzle 27.

The power take-off 9 (also known as the PTO) is located at the outlet of the reduction gear 10 and drives in rotation, for example, one or more of the thrusters of the aircraft 2, or an alternator-generator for the electrical generation. When the aircraft 2 is a helicopter, the power take-off 9 can drive a main rotor via a main transmission gearbox 28 (known by the acronym BTP) and a tail rotor (also known by the acronym RAC for tail rotor) via a tail transmission gearbox (known by the acronym BTA) (not shown).

As illustrated in FIG. 1, the turboshaft engine 1 comprises, from front to back, the transmission casing 25 (reduction gear 10 and transmission mechanism 24), the compressor 4, the power turbine 8, the expansion turbine 6 and the combustion chamber 5.

The gas generator 3 forms the high-pressure casing of the turboshaft engine 1, and the power turbine 8 and reduction gear 10 form the low-pressure body of the turboshaft engine 1.

As indicated above, the heat exchanger 11 recovers the residual thermal energy from the exhaust gases to heat the compressed air leaving the compressor 4 before it enters the combustion chamber 5.

The heat exchanger 11 can be, for example, a tube exchanger or a plate exchanger or a fin exchanger. The heat exchanger 11 can in particular be produced by additive manufacturing.

The inlet 13 of the first circuit 12 of the heat exchanger 11 is connected to an outlet 14 of the compressor 4 via a front supply 29 comprising one or more ducts. The front supply 29 may comprise a radial diffuser and an axial diffuser (also known as a stator vane), the outlet 14 of the compressor 4 being connected to an inlet of the radial diffuser and the inlet 13 of the first circuit 12 being connected to an outlet of the axial diffuser.

The outlet 15 of the first circuit 12 of the heat exchanger 11 is connected to an inlet 16 of the combustion chamber 5 via a rear supply 30 comprising one or more ducts. This rear supply 30 may comprise diffusion grids so as to control the Mach and gyration of the flow feeding the combustion chamber 5 via its inlet 16.

The inlet 18 of the second circuit 17 of the heat exchanger 11 is connected to the outlet 19 of the power turbine 8 via one or more internal ducts of the exhaust nozzle 27.

The outlet 33 of the second circuit 17 of the heat exchanger 11 is connected to the external environment via one or more external ducts of the exhaust nozzle 27.

Advantageously, as shown in FIG. 1, the heat exchanger 11 is annular around the axis X. Such a configuration is possible due to the positioning of the transmission casing 25 at the front end 20 of the turboshaft engine 1.

Advantageously, the heat exchanger 11 is axisymmetric with respect to the axis X, so as to obtain a balanced turboshaft engine.

Advantageously, the heat exchanger 11 is arranged at least partly around the compressor 4 and/or the power turbine 8 and/or the expansion turbine 6, and preferably at least partly around the power turbine 8.

According to the embodiment illustrated in FIG. 1, the heat exchanger 11 is annular and extends continuously around the axis X. In such a configuration, the heat exchanger 11 can be in a single part (or monobloc), and preferably produced by additive manufacturing (for example additive manufacturing by selective fusion on a powder bed). The additive manufacturing has the advantage of being able to produce complex shapes.

The heat exchanger 11 may be sectorized and comprise at least two sectors 31 placed circumferentially end to end or circumferentially distant from each other, each sector 31 of the heat exchanger 11 comprising a sub-inlet 32 of the first circuit 12 connected to the outlet 14 of the compressor 4. The first circuit 12 can be subdivided into a plurality of sub-first circuits, and each sector 31 can comprise a sub-first circuit. When the front supply 29 comprises a radial diffuser and an axial diffuser, each sub-inlet 32 of the first circuit 12 can be connected to a sub-outlet of the axial diffuser. A multi-outlet axial diffuser (also known as a pipe diffuser) can be used in this case. Each sector 31 may be a single part, preferably produced by additive manufacturing (e.g. additive manufacturing by selective melting on a powder bed). The advantage of having a sectorized heat exchanger 11 is that it simplifies maintenance and allows a defective sector 31 to be replaced independently of the others.

Figure 2:
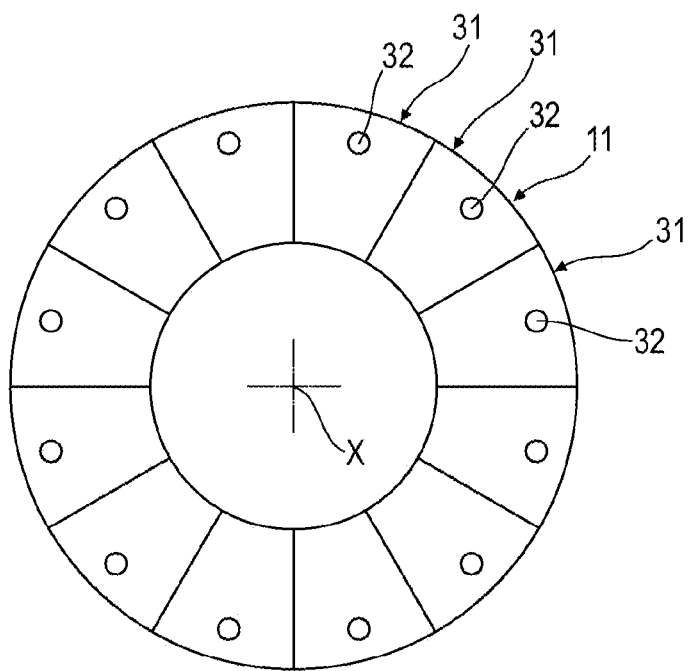
FIG. 2 is a detail view of a first alternative embodiment.

According to the first alternative embodiment illustrated in FIG. 2, the heat exchanger 11 is sectorized and comprises an annular row of twelve sectors 31 placed circumferentially end to end, each sector 31 of the heat exchanger 11 comprising a sub-inlet 32 of the first circuit 12 connected to the outlet 14 of the compressor 4.

Figure 3:
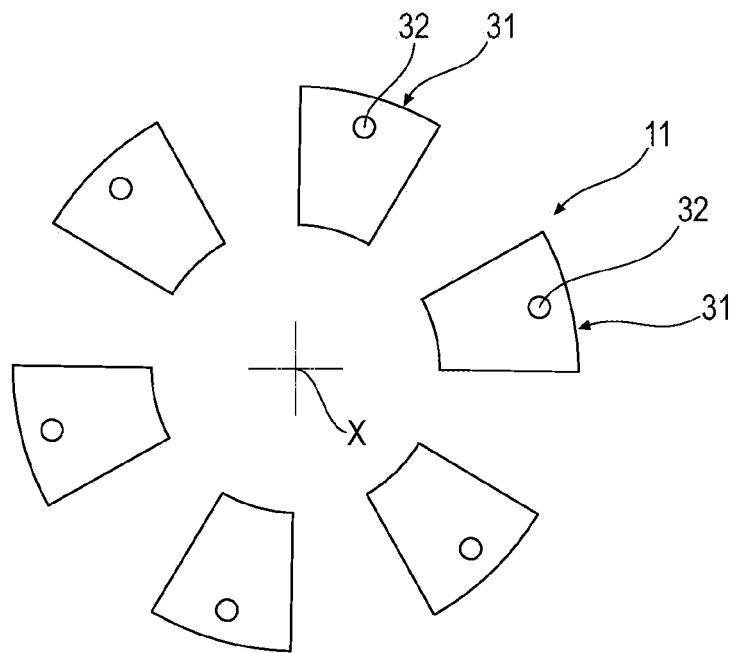
FIG. 3 is a detail view of a second alternative embodiment.

According to the second alternative embodiment illustrated in FIG. 3, the heat exchanger 11 is sectorized and comprises six sectors 31 distributed regularly around the axis X, two successive sectors 31 being circumferentially distant from each other, each sector 31 of the heat exchanger 11 comprising a sub-inlet 32 of the first circuit 12 connected to the outlet 14 of the compressor 4.

Advantageously, the turboshaft engine 1 comprises at least one first bypass duct 34 comprising an inlet connected to the outlet 14 of the compressor 4 and an outlet connected to the inlet 16 of the combustion chamber 5, so that the first bypass duct 34 supplies the combustion chamber 5 directly with compressed air leaving the compressor 4 without passing through the heat exchanger 11 (or bypassing the exchanger).

The turboshaft engine 1 may, of course, comprise a number of first ducts 34 distributed in a regular or irregular manner around the axis X, the first ducts 34 being able to have identical or different dimensional and geometric characteristics.

The first duct or ducts 34 are used in particular to supply the combustion chamber 5 during deceleration phases, when it is necessary to send the coldest possible air to the high-pressure turbine and therefore not be penalised by the heat stored in the heat exchanger. The need for deceleration on the helicopter's turboshaft engine(s) is important for its controllability, otherwise there's a risk of causing the main rotor to overspeed. The first duct or ducts 34 may be associated with valves to allow the control of the passage of air and the supply flow rate.

In the embodiment illustrated in FIG. 1, the turboshaft engine 1 comprises a single first bypass duct 34 which is arranged around the heat exchanger 11. When the heat exchanger 11 is sectorized, one or more first ducts 34 may pass through the exchanger 11 via the circumferential space defined between two successive sectors 31.

Advantageously, the turboshaft engine 1 comprises at least one second bypass duct 35 having an inlet connected to the outlet 19 of the power turbine 8 and an outlet connected to the nozzle 27, so that the second bypass duct 35 feeds exhaust gases leaving the power turbine 8 directly to the nozzle 27 without passing through the heat exchanger 11 (or bypassing the exchanger).

The turboshaft engine 1 may, of course, comprise several second ducts 35 which may or may not be evenly distributed around the axis X, the second ducts 35 having identical or different dimensional and geometric characteristics.

The second duct or ducts 35 are used in particular to evacuate the exhaust gases more quickly while minimising pressure losses, so as to increase the power of the turboshaft engine. This extra power is particularly useful when the turboshaft engine is in a high acceleration regime, for example the take-off regime where the turboshaft engine must quickly reach Maximum Take-Off Power, known by the acronym PMD. The second duct or ducts 35 may be associated with valves to allow the passage or not of exhaust gases and the exhaust flow rate to be controlled.

According to the embodiment illustrated in FIG. 1, the turboshaft engine 1 comprises a single second bypass duct 35 which extends radially outwards from the outlet 19 of the power turbine 8. When the heat exchanger 11 is sectorized, one or more second ducts 35 may pass through the exchanger 11 via the circumferential space defined between two successive sectors 31.

Advantageously, the transmission casing 25 comprises an accessory gearbox 36 designed to transmit mechanical power taken from the compressor 4 and/or the expansion turbine 6 and/or the power turbine 8 to various accessories of the turboshaft engine 1. The accessories include a pump, starter-alternator, air/oil separator, etc. Having the accessory gearbox 36 at a front end 20 of the turboshaft engine 1 optimises the arrangement of the accessories in relation to each other and maximises their number.

Advantageously, the heat exchanger 11 comprises a retaining shield 37 for the movable blades of the power turbine 8 configured to contain the movable blades in the event of overspeed of the power turbine 8. The blades of the power turbine 8 each comprise a frangible section which is configured to break when the power turbine 8 is overspeeding, these frangible sections form a blade shedding device allowing the rotor of the power turbine 8 to be stopped in the event of overspeed.

The retaining shield 37 could also be configured to contain the movable blades of the expansion turbine 6 in the event of overspeed of the expansion turbine 6.

The presence of the heat exchanger 11 forms a barrier to the noise produced by the turboshaft engine, with the exchanger 11 acting as a sound attenuator.

Advantageously, as shown in FIG. 1, the heat exchanger 11 can also include an acoustic attenuation layer 38. This acoustic attenuation layer 38 may, for example, comprise a cellular structure (for example a honeycomb structure).

Advantageously, as shown in FIG. 1, the first, second and third shafts 22, 23, 26 are coaxial with the axis X.

As shown in FIG. 1, the third shaft 26 of the power turbine 8 is arranged radially between the first and second shafts 22, 23.

As indicated above, according to the invention, the first shaft 22 of the compressor 4 is rotated by the second shaft 23 of the expansion turbine 6 via a transmission mechanism 24.

The transmission mechanism 24 may have a fixed or variable transmission ratio, which may be other than 1, i.e. either less than 1 or greater than 1.

When the transmission ratio is less than 1, the transmission mechanism 24 is a reduction gear, so that the speed of the first shaft 22 of the compressor 4 is lower than that of the second shaft 23 of the expansion turbine 6.

When the transmission ratio is greater than 1, the transmission mechanism 24 is a multiplier, so that the speed of the first shaft 22 of the compressor 4 is greater than that of the second shaft 23 of the expansion turbine 6.

Advantageously, as shown in FIG. 1, the transmission mechanism 24 has a fixed transmission ratio which is greater than 1, so that the speed of the first shaft 22 of the compressor 4 is greater than the speed of the second shaft 23 of the expansion turbine 6.

This configuration allows us to find the best compromise between the speed of compressor 4 and the speed of expansion turbine 6, so as to maximize the efficiency of these two components.

Advantageously, as shown in FIG. 1, the transmission mechanism 24 is a gear mechanism (or gear train). As indicated above, this gear mechanism 24 has a fixed transmission ratio which is greater than 1, so that the speed of the first shaft 22 of the compressor 4 is greater than the speed of the second shaft 23 of the expansion turbine 6.

The gear mechanism 24 may comprise one or more reduction stages. The gear mechanism 24 may also include one or more epicyclic gear trains. The epicyclic gears have the advantage of being able to offer high reduction or multiplication ratios while remaining compact.

More specifically, as illustrated in FIG. 1, the gear mechanism 24 comprises a first toothed wheel 39 secured to the first shaft 22 of the compressor 4 and a second toothed wheel 40 secured to the second shaft 23 of the expansion turbine 6. The reduction gear 10 comprises a third toothed wheel 41 secured to the third shaft 26 of the power turbine 8. The third toothed wheel 41 of the reduction gear 10 is arranged axially between the first and second toothed wheels 39, 40 of the transmission mechanism 24.

As shown in FIG. 1, the transmission casing 25 has, from front to back, the second toothed wheel 40, the third toothed wheel 41 and the first toothed wheel 39.

More specifically, according to the method illustrated in FIG. 1, the second toothed wheel 40 is centered on the axis X and is driving. The second toothed wheel 40 is linked in rotation to a front end of the second shaft 23. The second toothed wheel 40 is meshed with a first intermediate toothed wheel 42. The first intermediate toothed wheel 42 is driven and secured to an intermediate shaft 43 which is movable about an axis A which is offset radially with respect to the axis X and parallel to the axis X. The transmission mechanism 24 also comprises a second intermediate toothed wheel 44 which meshes with the first toothed wheel 39. The second intermediate toothed wheel 44 is driving and secured to the intermediate shaft 43. The first toothed wheel 39 is centered on the axis X and driven. The gears of transmission mechanism 24 are in external contact. The first toothed wheel 39 has fewer teeth than the second intermediate toothed wheel 44. The second toothed wheel 40 comprises more teeth than the first intermediate toothed wheel 42. The first and second toothed wheel 39, 40 rotate in the same direction, while the intermediate shaft 43 rotates in the opposite direction. The various toothed wheels 39, 40, 42, 44 of the gear mechanism 24 are used to obtain the desired transmission ratio. The first toothed wheel 39 can be either integrally formed with the first shaft 22, or attached to the first shaft 22 and linked in rotation with the first shaft 22 via coupling means such as splines or by shrink fitting.

According to the embodiment shown in FIG. 1, the third toothed wheel 41 is centered on the axis X and driving. The third toothed wheel 41 is linked in rotation to a front end of the third shaft 26. The third toothed wheel 41 is meshed with a third intermediate toothed wheel 45. The third intermediate toothed wheel 45 is a driven and is secured to the power take-off 9, which is movable about an axis B that is radially offset with respect to the axis X and parallel to the axis X.

Figure 4:
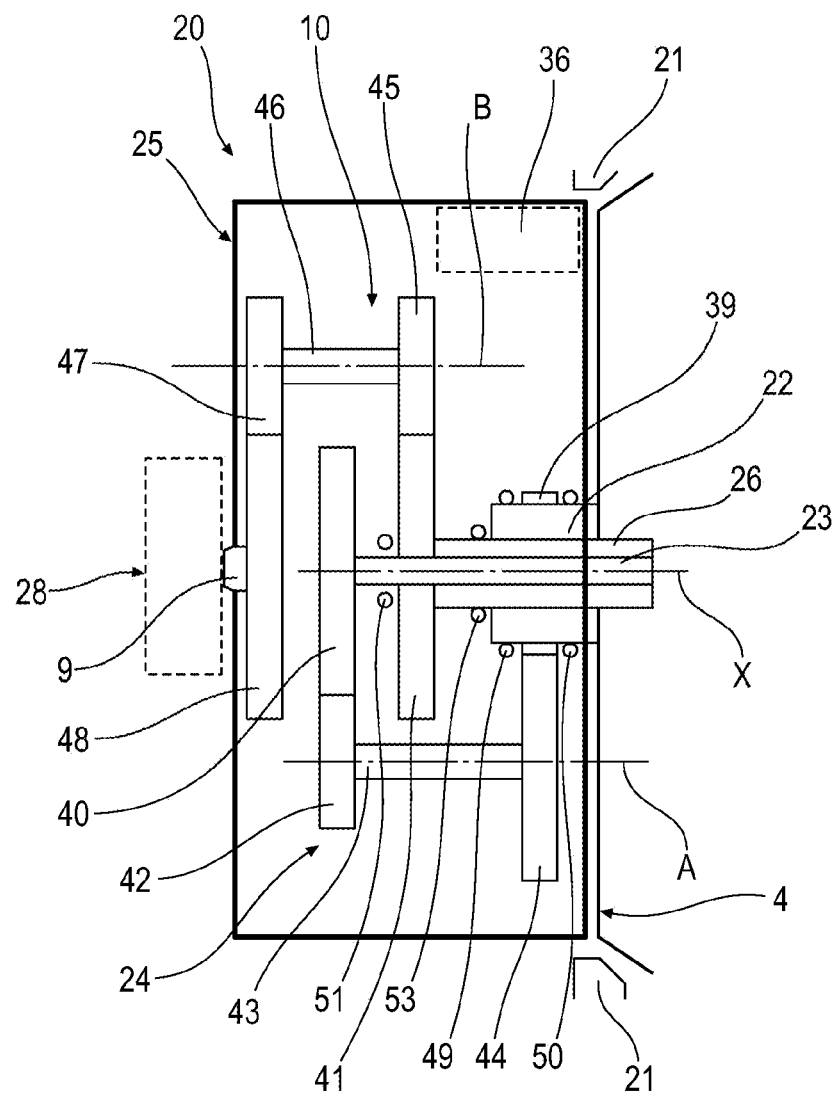
FIG. 4 is a detail view of a third alternative embodiment.

According to the third alternative embodiment illustrated in FIG. 4, the third intermediate toothed wheel 45 is secured to a second intermediate shaft 46 which is movable about the axis B which is offset radially with respect to the axis X and parallel to the axis X. The reduction gear 10 also comprises a fourth intermediate toothed wheel 47 which meshes with an outlet toothed wheel 48. The fourth intermediate toothed wheel 47 is driving by and secured to the second intermediate shaft 46. The outlet toothed wheel 48 receives power and is secured to the power take-off 9. The power take-off 9 is coaxial or vertically aligned with the axis X.

According to the embodiment shown in FIG. 1, the first shaft 22 of the compressor 4 is guided in rotation via a first bearing 49 and a second bearing 50 located in the transmission casing 25.

According to the embodiment shown in FIG. 1, the second shaft 23 of the expansion turbine 6 is guided in rotation via a third bearing 51 located in the transmission casing 25, and a fourth bearing 52 arranged at a rear end of the second shaft 23 located on the opposite side of the power turbine 8. This type of arrangement is used in particular when the combustion chamber 5 is reverse-flow, which avoids the need to install auxiliaries between the turbines 6 and 8, to the benefit of the axial dimensions of the turboshaft engine.

Figure 5:
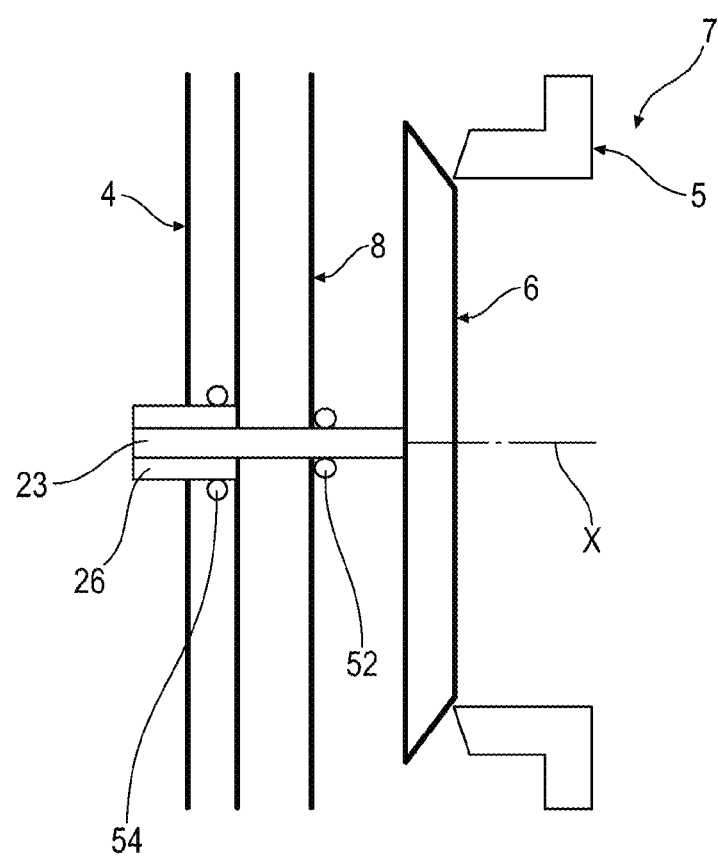
FIG. 5 is a detail view of a fourth alternative embodiment.

According to a fourth alternative embodiment illustrated in FIG. 5, the fourth bearing 52 for guiding the second shaft 23 is arranged between the expansion and power turbines 6, 8. This arrangement of the fourth bearing 52 is used in particular when the combustion chamber 5 does not have a free central space for installing a bearing.

According to the embodiment shown in FIG. 1, the third shaft 26 of the power turbine 8 is guided in rotation via a fifth bearing 53 located in the transmission casing 25, and a sixth bearing 54 located axially between the compressor 4 and the power turbine 8.

Advantageously, the bearings are rolling bearings. The toothed wheels and bearings are lubricated with a liquid lubricant such as oil. Generally speaking, each toothed wheel 39-48 can be either integrally formed with the corresponding shaft, or attached to the corresponding shaft and linked in rotation with the corresponding shaft via coupling means such as splines or by shrink-fitting. The advantage of using coupling means is that it is easy to replace the toothed wheels alone when they are worn and need replacing.

By convention, the different alternative embodiments and configurations presented in this application can of course be combined with each other.

The invention claimed is:

1. A turboshaft engine for an aircraft, the turboshaft engine comprising:
    a gas generator comprising a compressor, a combustion chamber and an expansion turbine, the compressor and the expansion turbine extending along a common longitudinal axis and being mechanically connected to one another, the combustion chamber being arranged axially at a rear end of the turboshaft engine;
    a power turbine arranged axially between the compressor and the expansion turbine, the power turbine driving a power take-off in rotation via a reduction gear;
    a heat exchanger comprising:
        a first circuit comprising an inlet connected to an outlet of the compressor, and an outlet connected to an inlet of the combustion chamber, and
        a second circuit comprising an inlet connected to an outlet of the power turbine,
    wherein the compressor comprises a first shaft driven in rotation by a second shaft of the expansion turbine via a transmission mechanism, said transmission mechanism and said reduction gear forming part of a transmission casing which is arranged axially at a front end of the turboshaft engine, so that the compressor is arranged axially between the transmission casing and the power turbine.

2. The turboshaft engine according to claim 1, wherein the power turbine comprises a third shaft, the first, second and third shafts being coaxial with said longitudinal axis.

3. The turboshaft engine according to claim 2, wherein the third shaft of the power turbine is arranged radially between the first and second shafts.

4. The turboshaft engine according to claim 2, wherein said third shaft of the power turbine is guided in rotation via a fifth bearing arranged in the transmission casing, and a sixth bearing arranged axially between the compressor and the power turbine.

5. The turboshaft engine according to claim 1, wherein said transmission mechanism has a transmission ratio greater than 1, so that the speed of the first shaft of the compressor is greater than the speed of the second shaft of the expansion turbine.

6. The turboshaft engine according to claim 1, wherein said transmission mechanism is a gear mechanism.

7. The turboshaft engine according to claim 6, wherein said transmission mechanism comprises a first toothed wheel secured to the first shaft of the compressor and a second toothed wheel secured to the second shaft of the expansion turbine, said reduction gear comprising a third toothed wheel secured to a third shaft of the power turbine, the third toothed wheel of the reduction gear being arranged axially between said first and second toothed wheels of the transmission mechanism.

8. The turboshaft engine according to claim 7, wherein the transmission casing has, from front to back, the second toothed wheel, the third toothed wheel and the first toothed wheel.

9. The turboshaft engine according to claim 1, wherein said power take-off is coaxial or vertically aligned with said longitudinal axis.

10. The turboshaft engine according to claim 1, wherein the first shaft of the compressor is guided in rotation via a first bearing and a second bearing arranged in the transmission casing.

11. The turboshaft engine according to claim 1, wherein said second shaft of the expansion turbine is guided in rotation via a third bearing arranged in the transmission casing, and a fourth bearing arranged either between the expansion and power turbines or at a rear end of said second shaft located on the opposite side to the power turbine.

12. An aircraft comprising a turboshaft engine according to claim 1.

13. A single-engine helicopter comprising a turboshaft engine according to claim 1.

* * * * *